(Model.)
J. GERARD.
CARVING FORK.
No. 247,038. Patented Sept. 13, 1881.
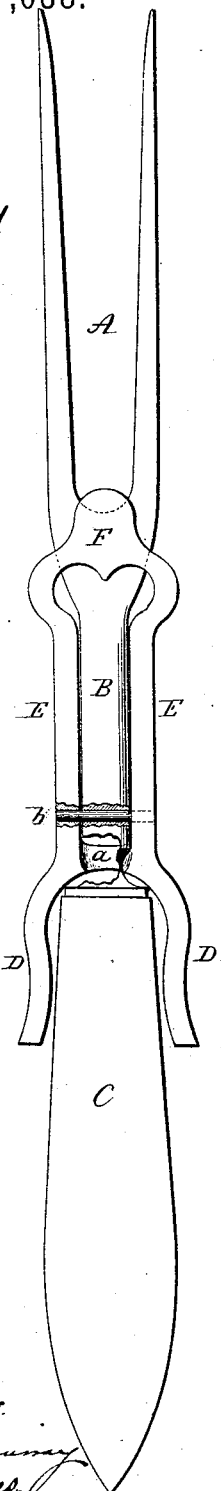
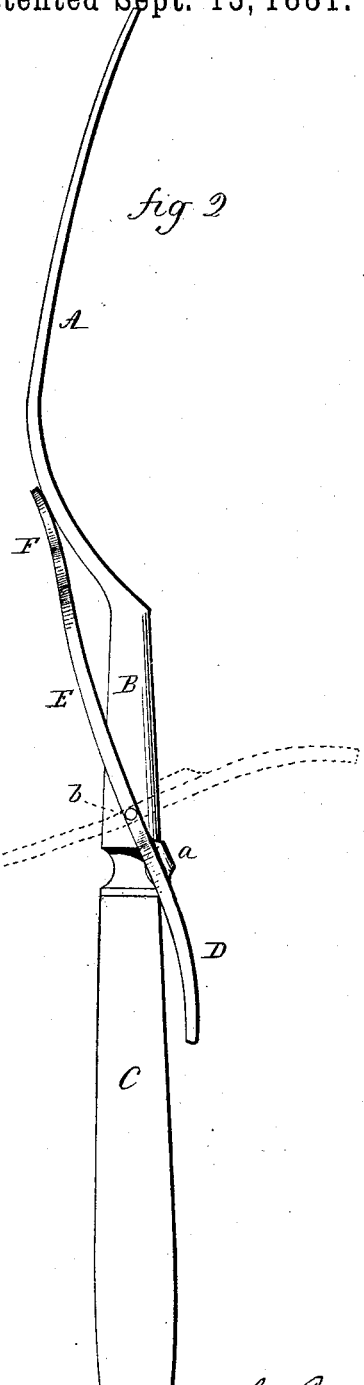
Witnesses:
J. H. Shumway
L. D. Rogers
John Gerard, Inventor
By atty.

UNITED STATES PATENT OFFICE.

JOHN GERARD, OF NEW BRITAIN, CONNECTICUT, ASSIGNOR TO LANDERS, FRARY & CLARK, OF SAME PLACE.

CARVING-FORK.

SPECIFICATION forming part of Letters Patent No. 247,038, dated September 13, 1881.

Application filed July 30, 1881. (Model.)

To all whom it may concern:

Be it known that I, JOHN GERARD, of New Britain, in the county of Hartford and State of Connecticut, have invented a new Improvement in Carving-Forks; and I do hereby declare the following, when taken in connection with the accompanying drawings and the letters of reference marked thereon, to be a full, clear, and exact description of the same, and which said drawings constitute part of this specification, and represent, in—

Figure 1, a sectional back view; Fig. 2, a side view.

This invention relates to an improvement in that class of carving-forks which are provided with a bifurcated rest hinged to the shank and extended from the hinging-points to form the guard; so that the said guard and rest will be turned down upon the fork when not required for use, or turned up when in use, so as to serve as a guard, the other to serve as a rest; and the invention consists in the construction and arrangement of the combined guard and rest, as more fully hereinafter described, and particularly recited in the claim.

A represents the prongs; B, the shank; C, the handle, of the usual shape. D D are the two legs of the rest, arranged one each side the shank, and connected by a cross-bar, $a$, upon the under side of the fork. The two legs D D are extended above to form two sides, E E, of the guard, said two sides coming together at the tip in the usual manner. The space between the two sides E E corresponds to the width of the shank B at the hinging-point, and should fit close. This hinging-point is above the cross-bar $a$, and consists of a pivot, $b$, introduced through the two sides and through the shank, as seen in Fig. 1. The two sides fit close to the shank, so that sufficient friction is produced between the shank and the two sides to retain the guard and rest at any position in which they may be set. The cross-bar $a$ firmly holds the two sides together, so that they cannot spring apart to reduce the friction, and also serves as a support or stop for the guard and rest when turned to their upright or working position, as seen in broken lines, Fig. 2.

I claim—

In a carving-fork, a rest consisting of the two legs D D, connected by the cross-bar $a$, and extended above each side the shank to form the guard, and hinged to the shank by a pivot, $e$, through the same and the two sides of the guard above the said cross-bar, substantially as described.

JOHN GERARD.

Witnesses:
J. C. ATWOOD.
C. S. LANDERS.